United States Patent [19]

Gibson

[11] Patent Number: 4,643,542
[45] Date of Patent: Feb. 17, 1987

[54] TELESCOPIC SIGHT WITH ERECTOR LENS FOCUS ADJUSTMENT

[75] Inventor: Dale E. Gibson, Salem, Oreg.

[73] Assignee: Leupold & Stevens, Beaverton, Oreg.

[21] Appl. No.: 583,810

[22] Filed: Feb. 27, 1984

[51] Int. Cl.$^4$ .............................................. G02B 27/32
[52] U.S. Cl. .................................... 350/562; 350/565
[58] Field of Search .............. 350/560, 562, 563, 564, 350/565, 566, 567, 570, 572, 561

[56] References Cited

U.S. PATENT DOCUMENTS

| | | | |
|---|---|---|---|
| 153,494 | 7/1874 | Nystrom et al. | 350/562 |
| 2,997,916 | 8/1961 | Friedman et al. | 88/32 |
| 3,058,301 | 10/1962 | Leupold | 88/32 |
| 3,151,205 | 9/1964 | Sparer | 350/561 |
| 3,161,716 | 12/1964 | Burris et al. | 88/32 |
| 3,213,539 | 10/1965 | Burris | 33/50 |
| 3,297,389 | 1/1967 | Gibson | 350/10 |
| 4,247,161 | 1/1981 | Unertl | 350/10 |
| 4,408,842 | 10/1983 | Gibson | 350/560 |

*Primary Examiner*—John K. Corbin
*Assistant Examiner*—Loha Ben
*Attorney, Agent, or Firm*—Klarquist, Sparkman, Campbell, Leigh and Whinston

[57] ABSTRACT

A telescopic sight is disclosed which may be used as a riflescope for viewing objects at different viewing distances. The telescopic sight is provided with a focus adjustment by longitudinal movement of the erector lens unit relative to an objective lens, an eyepiece lens and a reticle within the housing of such telescopic sight while maintaining a substantially constant magnification over the range of viewing distances. Such focus adjustment is accomplished in a simple manner with a rotatable knob coupled to the erector lens unit by a pin which is offset from the axis of rotation of such knob for orbital rotation, such axis of rotation extending laterally substantially perpendicular to the longitudinal movement of the erector lens unit. The focus adjustment pin is spring biased into engagement with a notch in a lens mounting tube containing the erector lens unit for longitudinal movement of the mounting tube in response to orbital rotation of the coupling pin by the focus adjustment knob. Rotation of the focus adjustment knob is limited by stops to less than 360° and is preferably limited to a 180° angle of adjustment. The objective lens and the eyepiece lens of the telescopic sight are fixed during focus adjustment of the erector lens unit, as is the reticle scale which is positioned between the eyepiece and the erector lens unit. As a result, telescopic sight is provided with substantially constant magnification throughout the range of focus adjustment so that the scope power changes less than 10.0% because the magnification of the erector lens unit changes less than 1.0% when focusing for objects at different viewing distances between infinity and 100 meters.

18 Claims, 6 Drawing Figures

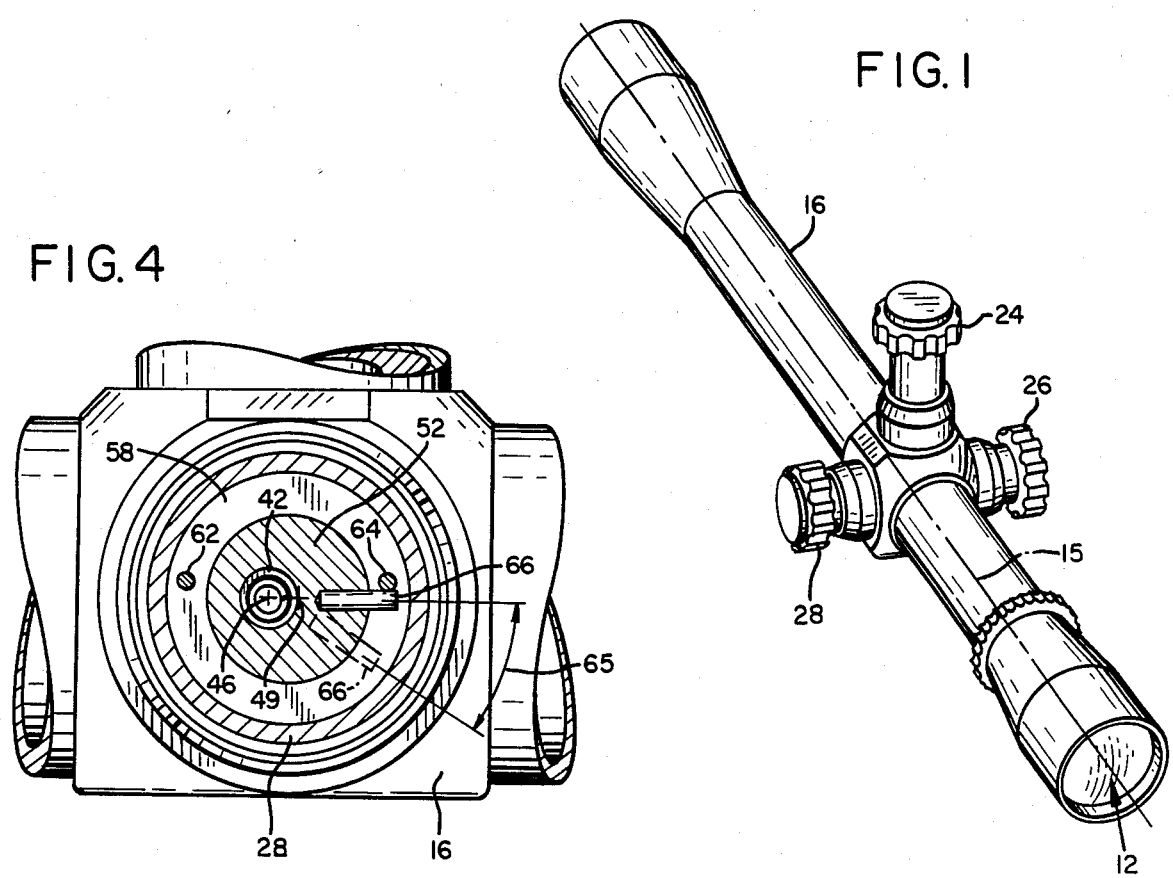
FIG. 1
FIG. 4
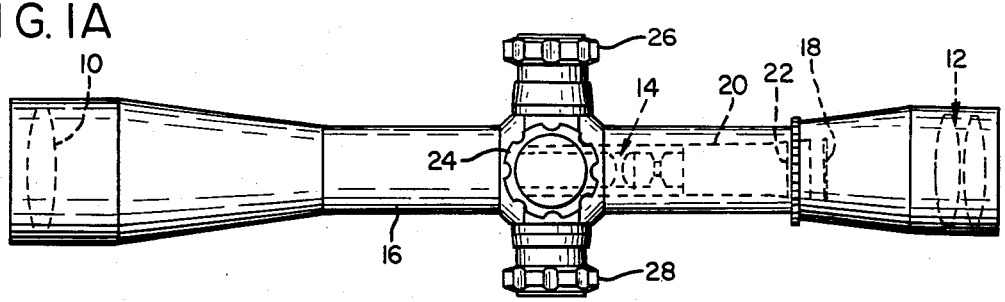
FIG. 1A
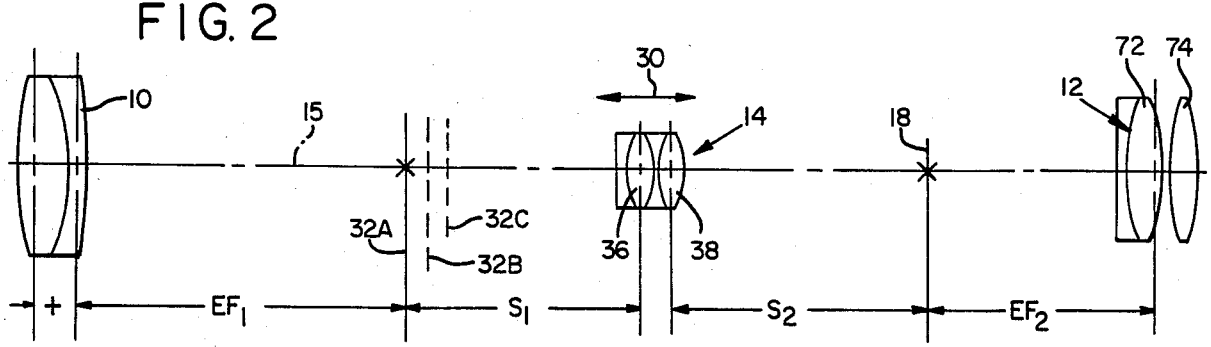
FIG. 2

TELESCOPIC SIGHT WITH ERECTOR LENS FOCUS ADJUSTMENT

BACKGROUND OF INVENTION

The present invention relates generally to telescopic sights having a focus adjustment achieved by longitudinal movement of an erector lens unit relative to the objective lens and eyepiece lens within such sight, and in particular to such a telescopic sight apparatus with such a focus adjustment while maintaining substantially fixed magnification over a wide range of object viewing distances. The focus adjustment is achieved by rotating a knob about an axis of rotation which extends substantially perpendicular to the longitudinal movement of the erector lens unit and is coupled thereto by a pin which is offset from such axis of rotation so that it orbits about such axis. Thus, rotation of the focus adjustment knob causes longitudinal movement of a lens mounting tube within which the erector lenses are mounted. The telescopic sight apparatus of the present invention is especially useful for a riflescope.

It is known to provide a telescopic sight for a riflescope with a movable erector lens unit which is adjusted longitudinally in order to vary the power or magnification by rotation of a cam sleeve having slots therein which are coupled by cam follower elements to the erector lens mounting tube, as shown in U.S. Pat. No. 3,058,391 of Leupold issued Oct. 16, 1962; U.S. Pat. No. 3,161,716 of Burris et al, issued Dec. 15, 1964 and U.S. Pat. No. 3,213,539 of Burris issued Oct. 26, 1965. However, in none of these prior riflescopes is longitudinal movement of the erector lens unit employed for adjusting the focus of a constant magnification telescopic sight in the manner of the present invention. Furthermore, none of these prior telescopic sights have a focus adjustment control in the form of a knob which rotates about an axis of rotation that extends substantially perpendicular to the longitudinal movement of the erector lens unit and is coupled thereto by a coupling pin offset from the axis of rotation so that such pin orbits about such axis to provide longitudinal movement to the lens unit, in the manner of the present invention.

It has previously been proposed in U.S. Pat. No. 4,408,842 of Gibson issued Oct. 11, 1983, U.S. Pat. No. 3,297,389 of Gibson issued Jan. 10, 1967 and U.S. Pat. No. 4,247,161 of Unertl issued Jan. 27, 1981 to provide a telescopic sight as a riflescope in which the erector lens unit is mounted within a lens tube that is moved laterally at one end by pivoting about the other end thereof to provide elevation and windage adjustments. This is achieved by rotation of windage and elevation adjustment knobs which extend into engagement with the lens tube to laterally displace such lens tube from the longitudinal axis of the telescopic sight apparatus. However, unlike the present invention, there is no longitudinal adjustment of the lens tube by rotation of a knob about an axis of rotation perpendicular thereto to enable longitudinal movement of the erector lens for focusing adjustment in the manner of the present invention.

In addition, U.S. Pat. No. 2,997,916 of Friedman et al issued Aug. 29, 1961 discloses a telescopic sight for a riflescope having an axially adjustable eyepiece lens for primary focusing and having an erector lens unit mounted in a tube which is adjusted longitudinally to reduce reticle image parallax. In this sight the reticle and the eyepiece are both attached to the opposite ends of the mounting tube of the erector lens so that they move with the erector lens during rotation of the parallax adjustment ring. Thus, the erector lens is not adjusted longitudinally relative to the objective lens, the eyepiece lens and the reticle in the manner of the telescopic sight of the present invention. Furthermore, longitudinal adjustment of the mounting tube of the erector lens unit in such patent is not achieved by rotation of an adjustment knob about an axis of rotation extending substantially perpendicular to the longitudinal axis of adjustment of the erector lens. Also, the parallax adjustment ring is not coupled to the erector lens unit by a coupling pin offset from the axis of rotation so that it orbits about such axis to provide such longitudinal movement of the lens tube, in the manner of the present invention.

The focus adjustment by longitudinal movement of the erector lens unit in the manner of the present invention is much simpler and more accurate than the focus adjustment means of the above cited patents. In addition, the focus adjustment means of the present invention provides extremely accurate focus adjustment over a wide range of viewing distances while maintaining a substantially fixed magnification which varies less than about ten percent. Thus, the magnification of the erector lens unit varies less than one percent during focus adjustment over a viewing range of from infinity to 100 meters.

SUMMARY OF INVENTION

It is therefore one object of the present invention to provide an improved telescopic sight of substantially constant magnification over a wide range of viewing distances between such scope and the object being viewed, in which a highly accurate focus adjustment is achieved by longitudinal movement of the erector lens unit relative to the objective lens, the eyepiece lens and the reticle in such sight.

Another object of the invention is to provide such a telescopic sight with a simple and trouble-free focus adjustment by longitudinal movement of the erector lens unit through rotation of a knob about an axis of rotation which extends substantially perpendicular to the direction of longitudinal movement of the erector lens unit.

A further object of the invention is to provide such a telescopic sight in which the focus adjustment knob is coupled to erector lens unit by a coupling pin which is offset from the axis of rotation of the knob for orbital rotation of the pin about such axis, such pin being coupled to the erector lens unit to provide longitudinal movement thereof in response to orbital rotation of such pin for a simple, accurate and trouble-free focus adjustment.

An additional object of the invention is to provide such a telescopic sight which maintains a substantially constant magnification over the entire range of focus adjustment covering changes in viewing distances from infinity to 50 feet.

Still another object of the invention is to provide such a telescopic sight apparatus of highly accurate operation which can be used as a riflescope.

A still further object of the present invention is to provide such a telescopic sight of simple and rugged construction so that it may be employed as a riflescope for military rifles.

DESCRIPTION OF DRAWINGS

Other objects and advantages of the present invention will be apparent from the following description of a preferred embodiment thereof, and from the attached drawings of which:

FIG. 1 is a perspective view of a riflescope in accordance with the present invention;

FIG. 1A is a side elevation view of the riflescope of FIG. 1 with its lenses shown in dashed lines;

FIG. 2 is a diagram of the optical system provided in the riflescope of FIGS. 1 and 1A.

FIG. 4 is a horizontal section view taken along the line 4—4 of FIG. 3; and

DESCRIPTION OF PREFERRED EMBODIMENT

Figure 3:
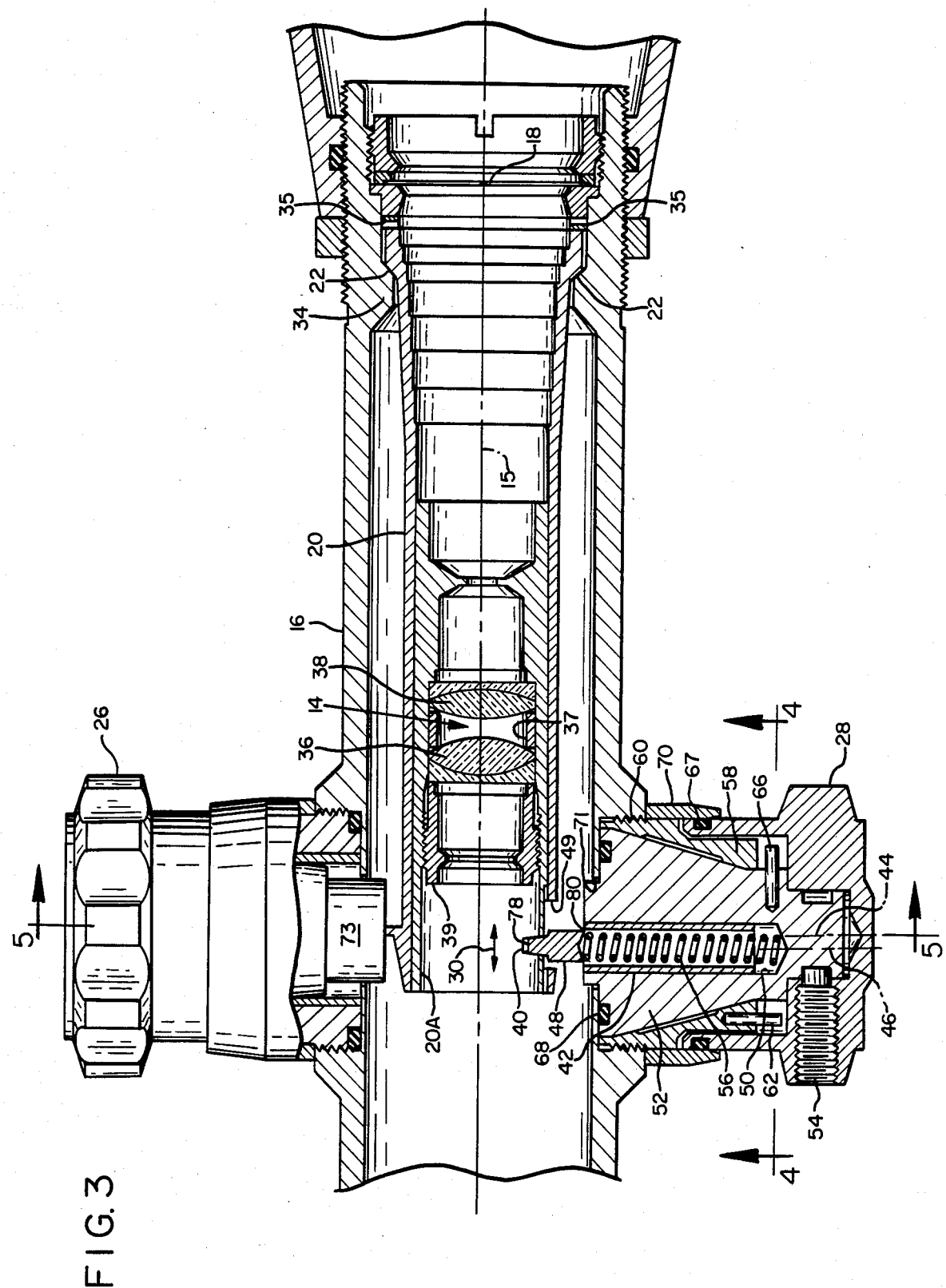
FIG. 3 is an enlarged partial section view of a portion of FIG. 1A showing the focus adjustment apparatus of the invention.

As shown in FIGS. 1, 1A and 2, the telescopic sight of the present invention includes an objective lens unit 10, an eyepiece lens unit 12 and an erector lens unit 14, all mounted along an optical system axis 15 within a tubular housing 16. A sight reticle 18 which may be provided by a pair of intersecting lines on a glass support plate, is fixedly mounted within the housing 16 between the eyepiece lens unit 12 and the erector lens unit 14. The erector lens unit 14 is mounted within a lens mounting tube 20 which can pivot about a half socket pivot 22 provided at the end of the mounting tube nearest the eyepiece lens 12 in response to elevation and windage adjustments. Thus, an elevation adjustment knob 24 is provided on the sight and coupled through the housing 16 into engagement with the front end of the mounting tube 20 so that rotation of such knob about a vertical axis of rotation 25 pivots such mounting tube vertically about pivot 22 as hereafter described relative to FIG. 5. This vertical elevation adjustment enables a rifleman to hit objects at different distances from the scope when the telescopic sight is used as a riflescope and can compensate for different rifle muzzle velocities. Similarly, a windage adjustment knob 26 is coupled through the housing 16 for engagement with the front end of the mounting tube 20 so that rotation of such knob about a horizontal axis of rotation 27 causes such mounting tube to pivot horizontally about pivot 22 in order to compensate for different wind conditions when such scope is employed as a riflescope.

The telescopic sight of the present invention is also provided with a focus adjustment knob 28 which extends through the housing tube 16 and is ccoupled to the mounting tube 20 for longitudinal movement of the erector lens unit 14. The focus adjustment knob 28 moves the erector lens unit in the longitudinal direction of arrow 30 substantially parallel to the optical system axis 15 to focus the image of the object being viewed on the plane of the reticle 18 and adjust the focus as the viewing distance changes over a range of from infinity to approximately 50 feet, while maintaining a substantially constant magnification which varies less than about 10%. The magnification or scope power (SP) of the optical system for the telescopic sight of FIG. 2 is given by the formula, $$SP = \frac{EF_1}{-EF_2} \times \frac{S_2}{-S_1};$$

where $EF_1$, $EF_2$ are the effective focal lengths of the objective lens 10 and the eyepiece lens 12 and $S_1$, $S_2$ are the spacings between the objective image plane 32 and the eyepiece image plane 18 to the erector lenses 36 and 38. The unit magnification (M) of the erector lens unit 14 equals $S_2/S_1$. For a 16× power scope in accordance with the present invention $EF_1 = 178.9884$, $EF_2 = 48.0147$, $S_2 = 53.6239$, $S_1 = 12.8140$ and $SP = 15.5999$ at a viewing distance (D) of infinity; while $EF_1 = 181.1150$, $EF_2 = 48.0147$, $S_2 = 51.3598$, $S_1 = 12.9504$ and $SP = 14.9596$ at D of 50 feet. Thus, for a 16× power scope $M = 4.1848$ at D of infinity and $M = 3.9659$ at D of 50 feet while the change in SP is about 4.1%.

The image plane of the object being viewed is shown by dashed lines 32 in FIG. 2. As the object being viewed moves from infinity to 50 feet towards the telescopic sight, the image plane 32 of such object moves from initial position 32A to intermediate position 32B, and to final position 32C toward the erector lens. If the erector lens unit 14 were fixed in position, the image planes 32A, 32B and 32C would not all be in focus on the reticle plane 18. However, by moving the erector lens unit 14 in longitudinal direction 30 for focus adjustment, each of the image planes 32A, 32B and 32C may be focused on the reticle plane 18. Thus, the focus adjustment knob 28 longitudinally moves the position of the erector lens 14 relative to the reticle 18, the eyepiece lens 12 and the objective lens 10 in order to focus on the reticle plane the image planes of objects located at different viewing distances from the sight. This focus adjustment is accomplished in the following manner.

Figure 5:
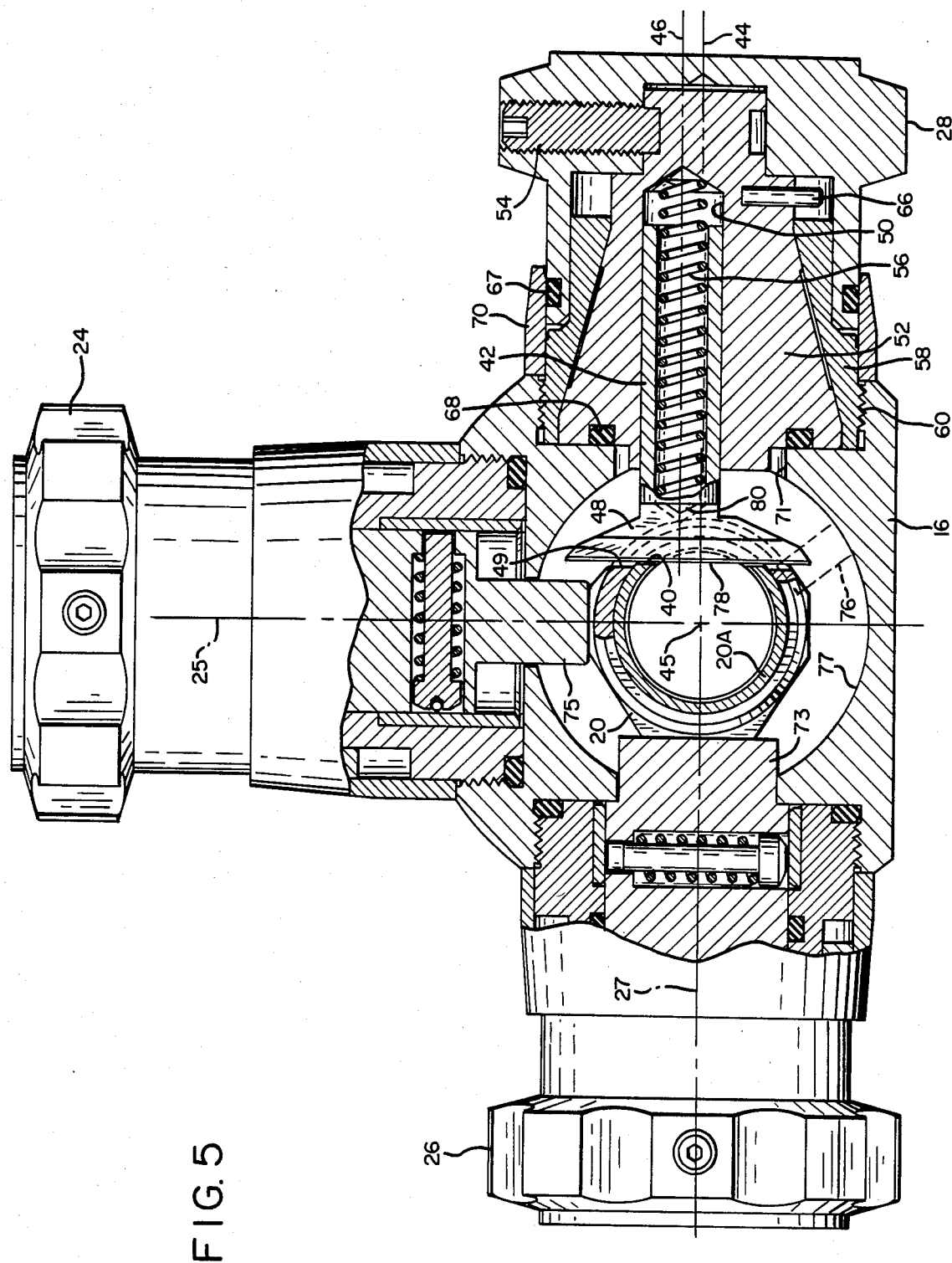
FIG. 5 is a vertical section view taken along the line 5—5 of FIG. 3.

As shown in FIG. 3 the mounting tube 20 for the erector lens unit 14 is pivoted about a half socket pivot 22 at the right end of such mounting tube adjacent the reticle 18 which is fixedly mounted within the tubular housing 16. In this regard, a hemispherical surface on the mounting tube 20 is resiliently biased against a 45 degree angle conical surface on a projection 34 on the inner suface of the housing 16 by a wave spring member 35 to form the half socket pivot 22 in the manner of U.S. Pat. No. 4,408,842 of Gibson issued Oct. 11, 1983. The lens mounting tube includes an inner tube portion 20A within which a pair of spaced erector lenses 36 and 38 separated by a spacer ring 37 are held to form the erector lens unit 14 so that such erector lenses move longitudinally with sliding movement of the inner mounting tube 20A. The mounting tubes 20 and 20A and the housing 16, as well as most other parts of the telescopic sight, are made of a light weight metal such as aluminum alloy. The inner mounting tube 20A is coupled by a notch 40 to a coupling pin 42 of brass that is rotated by the focus adjustment knob 28 about an axis of rotation 44 of such knob which intersects at point 45 the axes of rotation 25 and 27 of knobs 24 and 26, as shown in FIG. 5. The axis 46 of the coupling pin 42 is offset from the axis of rotation 44 of the knob 28 by an offset distance of about 0.060 inch so that such pin rotates in an orbital path about the axis of rotation when the focus adjustment knob is rotated. The axis of rotation 44 of the focus adjustment knob 28 extends laterally to and preferably substantially perpendicular to the direction of longitudinal movement 30 of the director lens unit 14 in response to rotation of the knob. A tapered enlarged end projection 48 on the inner end of the pin 42 slides up and down within coupling notch 40 as such pin is orbited about axis 44 to cause longitudinal movement of the mounting tube portion 20A and the erector lenses 36 and 38 back and forth in direction 30. The end 48 of the pin extends through an enlarged opening 49 in the side of the outer mounting tube 20 before entering the notch 40 in the inner tube 20A, such opening being wide enough for orbiting of the pin.

The coupling pin 42 is mounted within a cylindrical cavity 50 drilled into a focus adjustment cone member 52 of aluminum which is keyed to the focus adjustment knob 28 by a set screw 54 for rotation therewith. The pin cavity contains a coil spring 56 which is also inserted into a spring cavity in the outer end of the pin 42 in order to resiliently bias such pin into the coupling notch 40 of the mounting tube 20A. The focus adjustment cone 52 has a frustro-conical portion which is mounted within a seat member 58 of aluminum in the form of a sleeve with a conical inner surface and such seat member is threadedly connected by threads 60 on the outer surface of one end thereof to the housing 16. A pair of stop pins 62 and 64 are fixedly attached at angularly spaced positions to the outer end of the seat member 58 for engagement with a movable stop pin 66 extending from the side of a cylindrical end portion of member 52 in order to limit rotation of the knob 28, cone 52 and coupling pin 42 to an angle of rotation less than 360° and preferably of about 180°. As shown in FIG. 4, the erector lens focus adjustment is calibrated so that an object viewed at infinity is focused on the plane of the reticle 18 at an atmospheric temperature of 72° C. when the knob 28 has rotated the stop pin to position 66' at an angle 65 of about 33.5° from the fixed stop pin 64. This enables further focus adjustment for an object at a viewing distance of infinity to compensate for changes in temperature including hotter weather which lengthens the housing 16 by thermal expansion.

The telescopic sight is hermetically sealed and filled with nitrogen gas to prevent moisture condensation. To this end, a pair of rubber O-ring seals 67 and 68 are provided between the knob skirt portion, respectively, of knob 28 and a surrounding retainer sleeve 70, and between the bottom of the cone member 52 and the outer surface of a portion of the housing 16 of reduced thickness surrounding a housing opening 71 through which the end of such cone member extends inside the seal 68. Similar seals are provided for the windage and elevation adjustment means 26 and 24 whose coupling members 73 and 75, respectively, extend through openings in the housing 16 into engagement with the lens mounting tube 20, as shown in FIG. 5. The coupling members 73 and 75 are caused to move toward and away from the optical system axis 15 by the rotation of knobs 26 and 24. A leaf spring 76 is provided between the free end of the lens mounting tube 20 and the inner surface 77 of the housing 16 to resiliently bias such tube against the elevation and windage adjustment members 73 and 75. Coil spring 56 also aids in this biasing.

The eyepiece lens means 12 includes two lenses 72 and 74 whose position relative to the reticle 18 may be adjusted by the user by rotating an eyepiece adjustment ring (not shown) threaded to the eyepiece end of the main housing 16. This focuses the eye of the viewer on the plane of the reticle 18, and after such adjustment the eyepiece lens unit 12 is not moved further when the viewing distance of the object changes, such variation in viewing distance being instead compensated by the focus adjustment knob 28. The objective lens 10 is a lens doublet mounted within a mounting ring (not shown) which is threaded into the interior of the objective end of the main housing 16 and is locked in its calibrated position at the factory.

As shown in FIG. 5 the enlarged projection 48 on the inner end of the coupling pin 42 is provided with a narrow rectangular tip 78 which is of greater width than the shank of the coupling pin. For example, tip 78 may be approximately 0.75 inch wide vertically, whereas the shank of the coupling pin is approximately 0.2485 inch diameter. However, the thickness of the projection 48 in the longitudinal direction 30 is approximately 0.15 inch thick at its base and about 0.070 inch thick at its smallest tip portion 78. Tip portion 78 extends inwardly approximately 0.075 inch from the base portion of such projection. The enlarged projection 48 on the end of the coupling pin 42 enables such coupling pin to slide up and down in FIG. 5 within the coupling notch 40 during rotation of the focus adjustment knob 28. Vent holes 80 may be provided through the shank of the coupling pin 42 adjacent the base of the projection 48 to equalize the pressure within the coupling pin cavity 50. This prevents any piston-like movement of coupling pin 42 from producing a lower pressure within the pin cavity 50 which might otherwise prevent the spring 56 from urging the pin into coupling notch 40.

It should be noted that the pin projection 48 is not symmetrical about the pin axis 46, but the lower portion of such projection extends further downward from such pin axis than the upper portion extends above such pin axis. This is because the pin only orbits through an angle of approximately 180° during rotation of the focus adjustment knob 28, and the non-symmetry enables clearance within the housing 16 while maintaining maximum contact with the coupling notch 40 during the sliding movement of the projection 48. Thus, as shown in FIG. 4 when the focus adjustment knob 28 rotates about the axis of rotation 44, the movable stop pin 66 rotates clockwise through 180° from fixed stop pin 64 to fixed stop pin 62. This causes the axis 46 of the coupling pin 42 to orbit about the axis of rotation 44 clockwise also through 180°. As a result, the coupling pin end 48 slides upward in slot 40 to a maximum height position at an angle of 90° and then moves downward to the same height as that shown in FIG. 4 at the end of its 180° rotation. Of course, the coupling pin 42 also moves horizontally from left to right in FIG. 4 during clockwise rotation of the knob 28 which causes longitudinal movement of the erector lens unit 14 for focusing adjustment.

It will be obvious to those having ordinary skill in the art that many changes may be made in the above-described embodiment of the invention. Therefore, the scope of the invention should be determined by the following claims.

I claim:

1. A telescopic sight apparatus in which the improvement comprises:
   housing tube means;
   objective lens means and an eyepiece lens means mounted within said tube means;
   focusing adjustment means including image erector lens means and lens mount means for mounting said erector lens means within said tube means between said objective lens means and said eyepiece lens means for longitudinal movement to adjust the focus of said sight apparatus;

control means for longitudinal movement of said erector lens means relative to said eyepiece lens means and said objective lens means by rotation of said control means about an axis of rotation which extends laterally to the direction of longitudinal movement of said erector lens means; and coupling means including a coupling element extending laterally to the lens mount means and mounted at a position offset from the axis of rotation of said control means, for coupling said control means to said lens mount means and for causing longitudinal movement of said lens mount means by orbiting movement of said coupling element about the axis of rotation of the control means which extends substantially perpendicular to said direction of longitudinal movement in response to rotation of said control means to provide the focus adjustment of the sight apparatus.

2. Apparatus in accordance with claim 1 in which image magnification of the telescopic sight remains substantially constant over the range of focus adjustment.

3. Apparatus in accordance with claim 1 in which the coupling element includes a pin which engages a notch on said lens mount means for longitudinal movement of said lens mount means by orbital rotation of said pin about said axis of rotation.

4. Apparatus in accordance with claim 3 in which the pin is spring biased into engagement with said notch and the pin is caused to slide back and forth in said notch during said orbital rotation.

5. Apparatus in accordance with claim 1 in which the control means includes a knob means having a knob body on which said coupling means is mounted for rotation with said knob body about said axis of rotation which extends substantially perpendicular to the direction of longitudinal movement of the erector lens means.

6. Apparatus in accordancce with claim 5 in which the knob means has a stop means for limiting rotation of said knob means to less than 360 degrees.

7. Apparatus in accordance with claim 6 in which the stop means includes a movable stop means provided on the outer surface of said knob body and fixed stop means fixedly mounted adjacent to said knob body in position to be engaged by said movable stop means.

8. Apparatus in accordance with claim 7 in which the fixed stop means includes two stop pins spaced apart to enable rotation of the knob body through approximately 180 degrees.

9. Apparatus in accordancce with claim 1 in which the lens mount means includes a lens tube means containing the erector lens, elevation adjustment means for vertical adjustment of the lens tube means, and windage adjustment means for horizontal adjustment of the lens tube means, said lens tube means also being adjusted longitudinally by rotation of the control means for focusing.

10. Apparatus in accordance with claim 9 in which the elevation adjustment means includes first knob means which rotates about a first axis of rotation, the windage adjustment means includes a second knob means which rotates about a second axis of rotation, and said first and second axes of rotation intersect the axis of rotation of said control means at a common point of intersection.

11. A telescopic sight apparatus of substantially constant magnification, in which the improvement comprises:

housing tube means;

objective lens means and an eyepiece lens means mounted within said tube means;

focusing adjustment means including image erector lens means and lens mount means for mounting said erector lens means within said tube means between said objective lens means and said eyepiece lens means for longitudinal adjustment to adjust the focus of said sight apparatus;

control means for longitudinal movement of said erector lens means relative to said eyepiece lens means and said objective lens means by rotation of said control means about an axis of rotation of focusing the image of a viewed object over a wide range of viewing distances while maintaining image magnification substantially constant; and coupling means for coupling said control means to said lens mount means for causing longitudinal movement of said lens mount means in response to rotation of said control means to provide the focus adjustment of the sight apparatus, said coupling means includes a coupling element mounted at a position offset from the axis of rotation of said control means so that said coupling element orbits about said axis of rotation.

12. Apparatus in accordance with claim 11 in which the coupling element is a pin which engages a notch on said lens mount means for longitudinal movement of said lens mount means by orbital rotation of said pin about said axis of rotation.

13. Apparatus in accordance with claim 12 in which the pin is spring biased into engagement with said notch and the pin is caused to slide back and forth in said notch during said orbital rotation.

14. Apparatus in accordance with claim 11 in which the control means includes a knob means having a knob body on which said coupling means is mounted for rotation with said knob means about said axis or rotation which extends substantially perpendicular to the direction of longitudinal movement of the erector lens means.

15. Apparatus in accordance with claim 14 in which the knob means has a stop means for limiting rotation of said knob means to less than 360 degrees, the stop means includes a movable stop means provided on the outer surface of said knob body and fixed stop means fixedly mounted on said housing tube adjacent to said knob body in position to be engaged by said movable stop means.

16. Apparatus in accordance with claim 15 in which the fixed stop means includes two stop pins spaced apart to enable rotation of the knob body through approximately 180 degrees.

17. Apparatus in accordance with claim 11 in which the lens mount means is a lens tube means containing the erector lens and which includes elevation adjustment means for rotation about a first axis of rotation of cause vertical adjustment of the lens tube means, and windage adjustment means for rotation about a second axis of rotation to cause horizontal adjustment of the lens tube which is also adjusted longitudinally for focusing, said first and second axes of rotation intersecting the axis of rotation of said control means at a common intersection point.

18. Apparatus in accordance with claim 11 which also includes a reticle means mounted within said housing tube between said eyepiece lens means and said erector lens means, and said focusing adjustment means moves the erector lens means relative to said reticle means to focus an image of the object being viewed on said reticle means.

* * * * *